United States Patent
Kanbar

[19]

[11] Patent Number: 5,901,217
[45] Date of Patent: May 4, 1999

[54] ELECTRONIC TELEPHONE DIRECTORY DIALER MODULE

[76] Inventor: Maurice S. Kanbar, 2140 Pacific Ave., Apt. #503, San Francisco, Calif. 94115

[21] Appl. No.: 08/869,662

[22] Filed: Jun. 5, 1997

[51] Int. Cl.$^6$ .................................................. H04M 1/00
[52] U.S. Cl. ............................ 379/355; 379/354; 379/357
[58] Field of Search ..................................... 379/354, 355, 379/357, 93.36, 100.14, 67

[56] References Cited

U.S. PATENT DOCUMENTS

| | | | |
|---|---|---|---|
| 5,146,493 | 9/1992 | Kiguchi et al. | 379/357 |
| 5,283,826 | 2/1994 | Kurosawa et al. | 379/357 |
| 5,455,857 | 10/1995 | McGuire | 379/355 |
| 5,483,577 | 1/1996 | Gulick | 379/67 |

*Primary Examiner*—N. Le
*Assistant Examiner*—Shih-Wen Hsieh
*Attorney, Agent, or Firm*—Michael Ebert

[57] ABSTRACT

An electronic telephone directory-dialer module which makes it possible for a user to automatically dial any party listed in the directory by using a dial tone telephone set for this purpose, without having to manually dial the telephone number code on the keyboard of this set. Included in the module is a data base and a keyboard by which one enters into the base the names, addresses and telephone number codes of all parties of interest to users of the directory. Operatively coupled to the electronic directory is a dialer constituted by a tone generator adapted to convert the telephone number code of any selected party into corresponding dial tones and to reproduce those tones in a loud speaker. The base of the telephone set is provided with a slot for receiving the module, the slot incorporating a microphone which registers with the loud speaker of the socketed module and is coupled to the telephone line. In this way, dial tones emitted by the speaker and picked up by the microphone are conveyed over the telephone line to automatically dial the selected party.

5 Claims, 2 Drawing Sheets

ELECTRONIC TELEPHONE DIRECTORY DIALER MODULE

BACKGROUND OF INVENTION

1. Field of Invention

This invention relates generally to an electronic telephone directory having a data base in which is entered the telephone number codes of the listed parties, and more particularly to a module in which an electronic telephone directory is combined with a dialer adapted to convert the telephone number code of a selected party into corresponding dial tones, the module making it possible for a user to automatically dial any party listed in the directory by means of a dial tone telephone set without having to dial the telephone number code of the selected party on the keyboard of this set.

2. Status of Prior Art

A conventional telephone directory is a book, usually in loose-leaf form, containing an alphabetical listing of the names, addresses and telephone number codes of persons, organizations and firms of interest to those for whom the directory is intended. Thus when a user of the directory wishes to call any listed party, he must first consult the directory to obtain the telephone number code of this party, say 212-986-2480, and then manually dial this number on his telephone set.

Conventional telephone directories have many practical drawbacks. When a user wishes to call a particular party and needs to consult the directory to obtain his telephone number code, the telephone directory book may not then be next to the telephone set, and may be difficult to locate. And since the listings in the directory are usually hand written, they may be difficult to read. Moreover, where it comes to dialing a listed telephone number code, because this code when it includes an area code then has 10 digits, it is easy to make a dialing mistake, making it necessary to redial.

Also when the user of the directory is away from his home or office where he keeps the telephone directory book, he does not have it available to consult when making a call from a remote location.

Telephone sets now in use are mainly of the dial tone type, referred to by the Bell System as a "Touch-Tone" telephone. In a set of this type, the telephone number code of the party being called is entered by the user into a keyboard operatively coupled to a tone generator adapted to convert the number code into corresponding tones. Each digit in the number code is converted in the tone generator to a pair of audio frequencies which are simultaneously transmitted over the telephone line to which the set is coupled.

Thus the digit 5 is signaled by the transmission of 772 Hz and 1335 Hz tones. And digit 3 is transmitted by 697 Hz and 1,477 Hz tones. Because these tone pairs lie in the voice frequency range, they can be transmitted over the telephone line. And they can also be used for purposes besides dialing in other data communication applications.

It is known to provide electronic telephone directories capable of producing dial tones corresponding to a telephone number code listed in the directory. Thus the 1996 patent to Talvard et al. U.S. Pat. No. 5,583,919 notes that it is known to provide a telephone dialer and directory having "an alphanumeric keyboard and a small loudspeaker enabling dual-tone multifrequency (DTMF) dialing signals to be emitted corresponding to various digits of a telephone number."

The 1996 U.S. Pat. No. 5,557,662 to Kenmochi et al. notes that "Conventional so-called electronic telephone directories store telephone numbers and names in pairs. The user can search the telephone numbers and select one of such previously-stored telephone numbers, by manipulating the keys provided on the electronic telephone directory. When a start key is depressed, the electronic telephone directory generates acoustic tones (BP tones) corresponding to the telephone number on display. Thus the user can make a telephone call without using the keys of the telephone by depressing the start key."

The 1995 U.S. Pat. No. 5,452,352 to Talton discloses an automatic dialing system in a credit card format. The credit card includes a memory to which telephone numbers are stored, a keyboard to enter the numbers in the memory, a tone generator and a loud speaker. To dial a telephone number using this credit card, the card which emits the dial tones of the telephone number code to be called, is brought against the transmitter of a standard touch-tone telephone set.

Also in a card format for automatic dialing is the calling card shown in the 1995 McGuire U.S. Pat. No. 5,455,857. As in the above patents, audible dial tones representing a telephone number are generated by the card. Along the same lines is the telephone dialer card disclosed in the 1994 Bazemore et al. U.S. Pat. No. 5,377,263.

As pointed out above, a telephone directory, in order to be useful, must be available to its user when he wishes to make a call. A directory which is not next to the telephone set or cannot be found, serves no useful purpose.

The electronic telephone directories and dialers disclosed in the above-identified patents are independent of the dial-tone telephone sets in connection with which they are useful. Hence if the electronic telephone directory is misplaced, it cannot be brought next to the transmitter of the telephone set to emit dial tones for dialing a selected telephone number code.

Another drawback of existing electronic telephone directories and dialers is that they depend on batteries as their power source, and therefore cease to function when these batteries are run down or exhausted. With an electronic telephone directory that is put to frequent use, the user may find that the batteries are no longer effective just as he is about to make a call. While these batteries may be replaced or recharged, the availability of the directory is then interrupted.

Yet another drawback of known types of electronic telephone directories is that it takes a fair amount of time and effort to correctly enter into the data base or memory of the directory all of the parties to be listed therein. If the user of this directory has in his home or office several touch-tone telephone sets at different sites, and he also wishes to consult the directory at telephone sets away from his office or home, he requires for this purpose several like electronic telephone directories. It becomes necessary therefore to enter into these additional directories the many listings entered into the first directory, a time consuming and tedious task.

SUMMARY OF INVENTION

In view of the foregoing, the main object of this invention is to provide a compact and efficient electronic telephone directory-dialer module, which emits dial tones corresponding to any telephone number code listed in the directory, making it possible for a user of the module to dial any party listed into the directory by means of a dial tone telephone set without having to enter the telephone number code of the party in the keyboard of the set.

A significant feature of a module in accordance with the invention is that it is normally socketed in the base of the dial tone telephone set and is therefore available for use whenever a call is to be made via this set. When the module is socketed in the base of the telephone set, the keyboard of the module is then adjacent the keyboard of the set, and a user then has direct access to both keyboards.

More particularly, an object of this invention is to provide a module of the above type which is adapted either to be socketed in the base of the dial tone telephone set, in which case dial tones emitted by the module are picked up by a microphone installed in the base, or to be placed adjacent the transmitter in the mouth piece of the set, the dial tones emitted by the module in either case being conveyed over the telephone line connected to the set.

Yet another object of this invention is to provide a module of the above type in which data regarding the listed parties entered into the data base of the module may be downloaded into the data base of a like module, thereby making it possible to create duplicate modules.

Still another object of this invention is to provide a module having an LCD display which presents the name, address and telephone number code of the party selected to be called, as well as other information regarding this party.

Briefly stated, these objects are attained by an electronic telephone directory-dialer module which makes it possible for a user to automatically dial any party listed in the directory by using a dial tone telephone set for this purpose, without having to manually dial the telephone number code on the keyboard of this set.

Included in the module is a data base and a keyboard by which one enters into the base the names, addresses and telephone number codes of all parties of interest to users of the directory. Operatively coupled to the electronic directory is a dialer constituted by a tone generator adapted to convert the telephone number code of any selected party into corresponding dial tones and to reproduce those tones in a loud speaker.

The base of the telephone set is provided with a slot for receiving the module, the slot incorporating a microphone which registers with the loud speaker of the socketed module. In this way, dial tones emitted by the speaker and picked up by the microphone are conveyed over the telephone line coupled to the set to automatically dial the party the user wishes to call.

BRIEF DESCRIPTION OF DRAWING

For a better understanding of the invention, as well as further features thereof, reference is made to the detailed description thereof to be read in connection with the annexed drawings wherein.

DETAILED DESCRIPTION OF INVENTION

Figure 1:
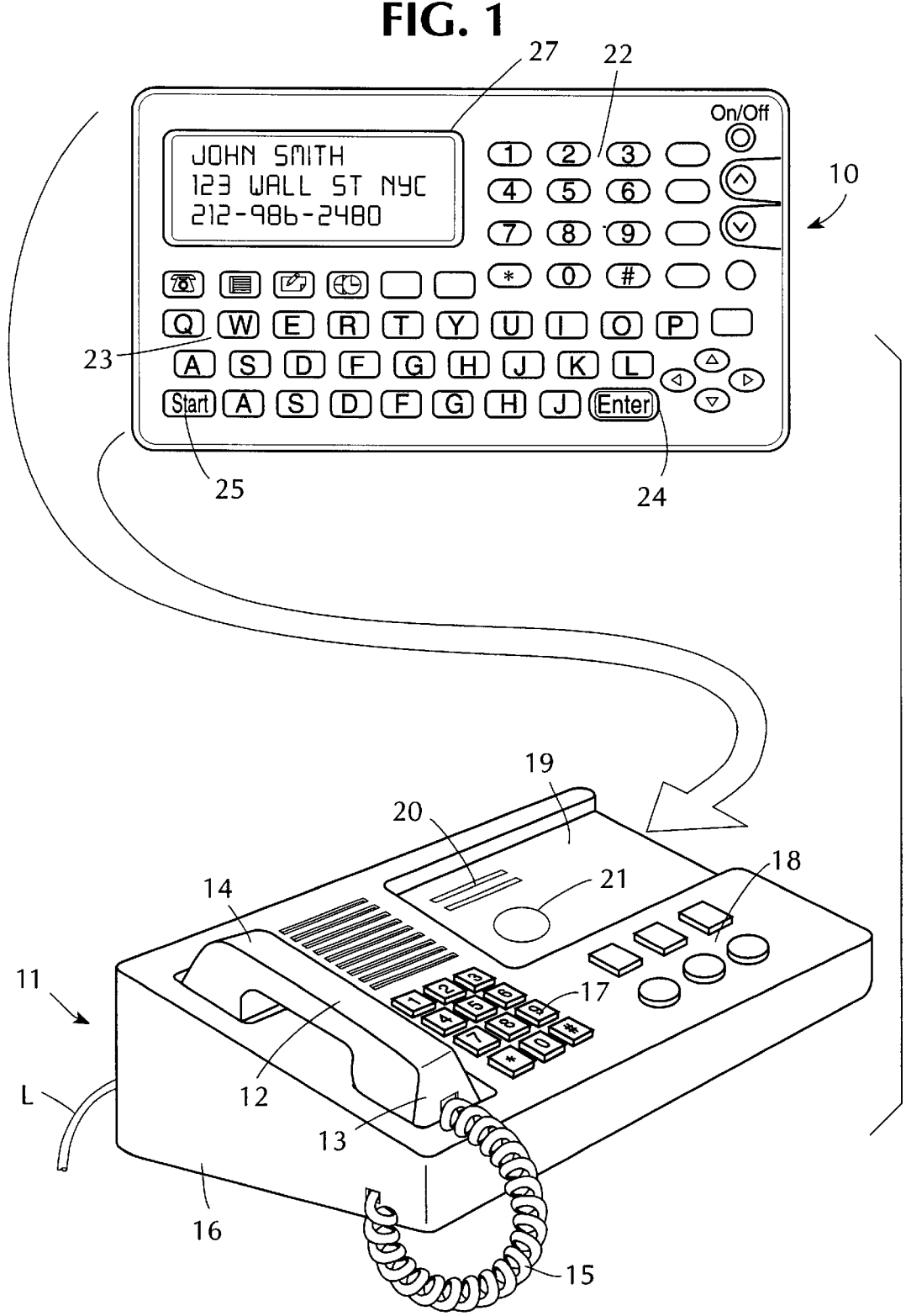
FIG. 1 shows an electronic directory-dialer module in accordance with the invention and a dial-tone telephone set having a slot to socket the module.

Referring now to FIG. 1, there is shown in this figure an electronic telephone directory-dialer module 10 in accordance with the invention, module 10 cooperating with a dial-tone telephone set generally designated by reference numeral 11.

Dial-tone telephone set as in a conventional set of this type, includes a hand set 12 having a microphone or transmitter 13 and an earphone or receiver 14. Hand set 12 which is cradled in a base 16 is connected by a cable 15 to the circuits housed within the base of the telephone set. Mounted on the control panel on the top of base 16 is a standard dialing keyboard 17 and a set of function keys 18.

Associated with keyboard 17, as in all standard dial-tone telephone sets, is a tone generator for converting the digits manually keyed therein which represent the telephone number code of the party being called into audio frequency tones. These tones are conveyed over telephone line L to which set 11 is coupled to dial the party being called.

The tone generator included in a standard dial-tone telephone set to produce tone pairs is usually formed by two tuned transformers connected in series and operating in conjunction with a transistor to produce tones whose frequencies depend on selected taps on the transformer windings.

In the absence of module 10, telephone set 11 operates in a conventional manner, and to call a party whose telephone number code is known, one picks up the handset 12 and then manually enters into keyboard 17 the digits of this code, to produce dial tones which are transmitted over line L.

When the electronic telephone directory-dialer module 10 is operatively coupled to telephone set 11, the user is then relieved of the need to manually operate keyboard 17 to dial a party, for the electronic directory of this module stores the telephone number code of the party to be called and automatically dials this number.

Figure 2:
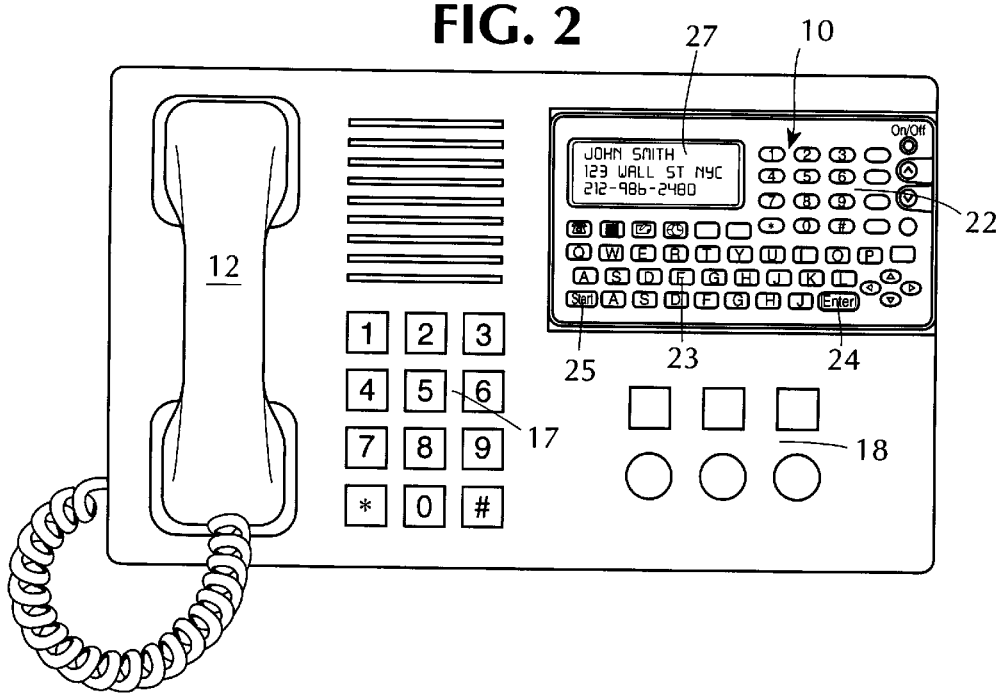
FIG. 2 shows the module socketed in the set.

To accommodate nodule 10, telephone set 11, as shown in FIG. 2, is provided at the upper end of base 16 on the side opposite the side on which hand set 12 is cradled with a rectangular slot 19. The dimensions of slot 19 substantially match those of the rectangular module 10 whereby module 10 may be slid into and snugly socketed in slot 19.

Slot 19 has embedded in its bottom wall a pair of parallel metal strip contacts 20. These are connected to telephone line L so that the d-c voltage on the line appears across these contacts. Adjacent contacts 20 and flush with the bottom wall of slot 19 is a microphone 21 which is coupled to telephone line L, as is the transmitter 13 in the hand set. Microphone 21 is normally disconnected from the line and is activated only by the insertion of module 10 in slot 19. For this purpose, a switch (not shown) may be embedded in the bottom of the slot, the switch having a depressible actuator which is depressed by the inserted module.

When microphone 21 is operative, it picks up dial tone yielded by module 10, and it is these dial tones which dial a party linked to the telephone line L, not dial tones produced by operating keyboard 17 of the telephone set 11.

Figure 4:
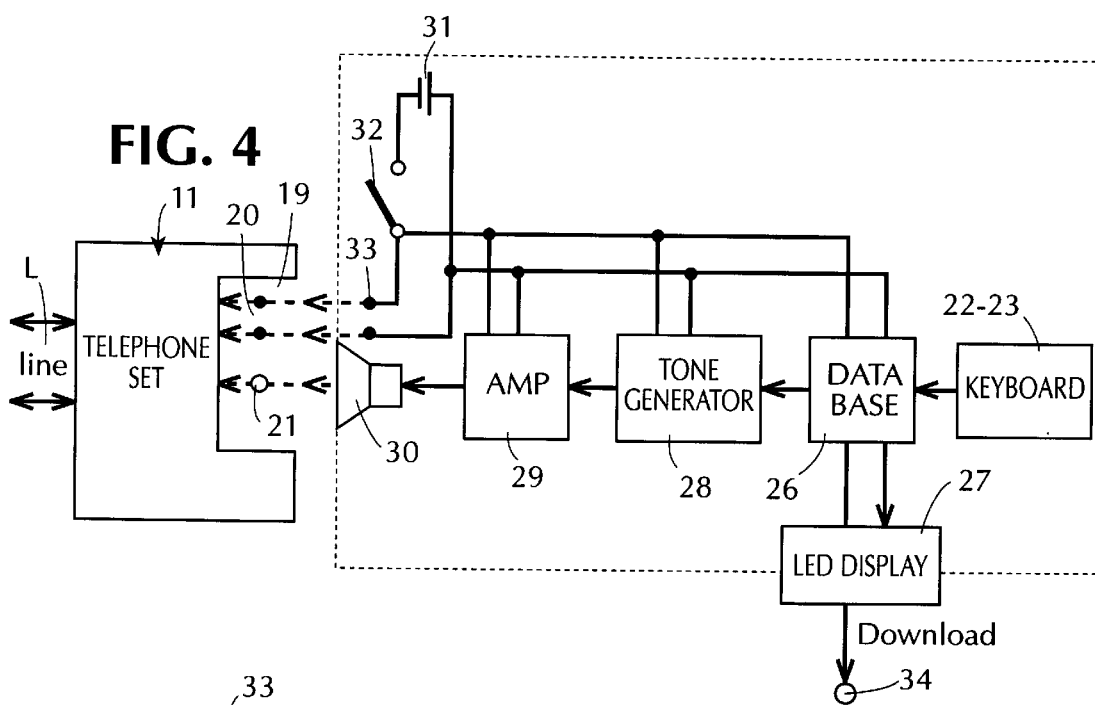
FIG. 4 is a block diagram showing the components which are included in the module and their operative relation to the telephone set.

As shown in FIG. 1, module 10 includes a numeric keyboard 23 and an alphabetic keyboard 23, an ENTER key 24 and a START key. These keyboards, as shown in FIG. 4 are coupled to a computer data base 26 so that by operating these keyboards, one can enter into the data base and store therein the names, addresses and telephone number codes of all parties to be listed in the electronic directory. Depending on the memory capacity of the data base, one can also enter other data, such as the names of the spouse and children of the listed party.

Associated with data base 26 is an LCD display 27 which when the electronic directory is consulted, then presents the name of the party to be called, his address and telephone code number. An example of this display is shown in FIG. 1 in connection with John Smith whose address and phone number are given. In all cases, the phone number includes the area code which is shown in FIG. 1 as 212. Where other data regarding a party is also stored in the data base, this data will also be displayed.

Figure 3:
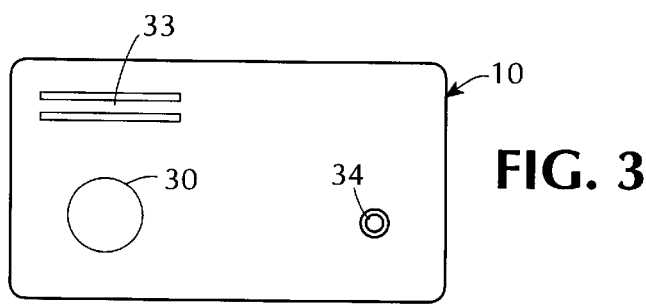
FIG. 3 shows the underside of the module.

Data base 26 is coupled to a tone generator 28 which may be essentially the same as that included in telephone set 11 for converting into tones the digits of a telephone number code into dial tones. However in a telephone set, the digits to be converted into tones are derived manually from a keyboard, whereas in the module arrangement, the digits are yielded by the data base. The dial tones produced by generator 28 are fed to a solid state amplifier 29 whose output is applied to a miniature loud speaker 30 positioned on the underside of the module, as shown in FIG. 3.

Data regarding all parties listed in the electronic telephone directory including the telephone code number of each party, makes it possible to dial any party reachable by the dial tone telephone set 11. In order to call a particular party listed in the module directory, one has only to use the first three letters of the party's last name. If that name is SMITH, then to extract the telephone number code of Smith from the directory one keys in the letters SMI, and one then sees on display 27 the full name JOHN SMITH below which is his address and telephone number code 212-986-2480.

Then to automatically dial John Smith, one simply presses the START key 25, and the digits of the number code are converted into dial tones which emanate from loud speaker 30.

When module 10 is socketed in slot 19 of the telephone set 11, speaker 30 at the underside of the module then registers with microphone 21 embedded in this slot. Hence the dial tones emanating from the speaker and picked up by the microphone are conveyed over telephone line L to automatically dial the party being called.

As shown in FIG. 4, module 10 is provided with an internal d-c power supply represented by battery 31. In practice, the battery may be of the lithium type included in hand-held electronic calculators. But battery 31 is connected to the stages of the module through a normally-open switch 32. This switch is closed only when the module is separated from telephone set 11, and the module is then to be used with a telephone set which does not include a slot 19 to receive the module.

When module 10 is socketed in slot 19 of dial-tone telephone set 11, it then derives its d-c operating power from the telephone line which supplies power to the telephone set. To this end, the underside of module 10 is provided, as shown in FIG. 3 with a pair of parallel metal contacts 33.

Contacts 33 are so placed that when module 10 is slid into slot 19, contacts 33 of the module then engage contacts 20 installed in the slot and connected to line L. Hence d-c power carried by this line is now also supplied to the module, making an internal power source unnecessary. But when using the module with a telephone set that has no slot, one must turn on the internal battery 32 to power the module. And one must place the powered module adjacent the mouthpiece transmitter of this set. In that situation, the dial tones representing the telephone number code of the party to be called which emanate from the loud speaker of the module will be picked up by this transmitter and conveyed over the telephone line.

A user may have need for several modules all having the same electronic directory entered therein. Thus where a user has several telephone sets in his home and also in his office, he will then need a module for each set. To make it possible to produce duplicate modules, module 10 in which data base 265 is loaded with the directory listings, is provided with a down-load outlet 34. This makes it possible to down load the electronic telephone directory to the data base of like modules, thereby doing away with the need to enter therein, by way of the keyboard, the electronic directory.

It is to be noted that when module 10 is socketed in slot 19 of the telephone set, as shown in FIG. 2, then the keyboard of the module is flush with the upper control panel of base 16 of the set, and is effectively incorporated in the panel adjacent the keyboard of the telephone set. Thus the user has direct access to both keyboards, and when he wishes to call a party whose number is listed in the module, he uses the module keyboard for this purpose in the manner previously explained. But if the user wishes to call a party whose number is not listed in the module, then he uses the keyboard 17 of the telephone set to manually dial the party. Thus the telephone directory-dialer module is effectively integrated with a dial tone telephone set.

While there has been shown and described a preferred embodiment of an electronic telephone directory-dialer module, it will be appreciated that many changes and modifications may be made therein without, however, departing from the essential spirit thereof.

I claim:

1. In combination, an electronic telephone directory-dialer module operating in conjunction with a dial-tone telephone set coupled to a telephone line supplying power to the set, the set including a transmitter coupled to the line and a manually-operated keyboard to produce dial tones corresponding to the telephone number code of a party to be called; said module comprising:

A. a data base associated with an alphanumeric keyboard for entering into the data base the names, addresses and telephone number codes of a plurality of parties to create an electronic directory;

B. a dialer operatively coupled to the directory adapted to convert the number code of any party selected from the directory into corresponding dial tones which are reproducible so that they are audible; and C. a loud speaker to reproduce the audible tones emanating from the module and to convey them over the telephone line to dial the selected party without having to use the telephone set keyboard for this purpose, the telephone set including a slot adapted to receive the module and having line contacts therein connected to the telephone line to derive power from the line, said slot being provided with a microphone to pick up the dial tones emanating from the loud speaker in the module and to convey them to the telephone line, whereby when the module is placed in the slot the dial tones from the loud speaker are then conveyed to the telephone line through the microphone in the slot, and when the module is removed from the slot, the dial tones from the loud speaker may then be conveyed to the telephone line through the transmitter of the set, said module including a battery to supply power thereto when the module is removed from the slot and is then disconnected from the telephone line supplying power thereto, said module further including power input contacts which when the module is received in the slot then engage said line contacts in the slot whereby the power carried by the line is then supplied to the module.

2. A module as set forth in claim 1, in which the dialer includes a tone generator for producing the dial tones, said loud speaker being coupled to the generator to render the tones audible.

3. A module as set forth in claim 2, further including an LCD display coupled to the data base to present the name, address and number code of the selected party.

4. A module as set forth in claim 3, in which the keyboard of the module includes a start key which is pressed when the display presents the number code of the selected party to then activate the tone generator to produce the dial tone for dialing this party.

5. A module as set forth in claim 1, including means to connect the module to the telephone line to power the module with the power supplied by the line to the set.

* * * * *